March 27, 1962 G. W. WRIGHT 3,027,211

DISPENSER FRAME AND HOUSING CONSTRUCTION

Filed May 27, 1959 6 Sheets-Sheet 1

GEORGE W. WRIGHT
*INVENTOR.*

BY Edmund W. C. Kamm
ATTORNEY

GEORGE W. WRIGHT
INVENTOR.

BY Edmund W. E. Kamm
ATTORNEY

March 27, 1962 G. W. WRIGHT 3,027,211

DISPENSER FRAME AND HOUSING CONSTRUCTION

Filed May 27, 1959

6 Sheets-Sheet 3

GEORGE W. WRIGHT
*INVENTOR.*

BY Edmund W.E. Lamm
ATTORNEY

March 27, 1962 G. W. WRIGHT 3,027,211

DISPENSER FRAME AND HOUSING CONSTRUCTION

Filed May 27, 1959

6 Sheets-Sheet 4

GEORGE W. WRIGHT
*INVENTOR.*

BY Edmund W. E. Kamm
ATTORNEY

DISPENSER FRAME AND HOUSING CONSTRUCTION

Filed May 27, 1959 6 Sheets-Sheet 5

GEORGE W. WRIGHT
*INVENTOR.*

BY Edmund W. E. Kamm
ATTORNEY

GEORGE W. WRIGHT
INVENTOR.
BY Edmund W. E. Kamm
ATTORNEY

United States Patent Office 3,027,211
Patented Mar. 27, 1962

3,027,211
DISPENSER FRAME AND HOUSING CONSTRUCTION

George W. Wright, Yoder, Ind., assignor to Tokheim Corporation, Fort Wayne, Ind., a corporation of Indiana Filed May 27, 1959, Ser. No. 816,136
24 Claims. (Cl. 312—100)

This invention relates to a dispenser construction. More specifically it relates to a dispenser construction which includes a basic chassis sub-assembly and basic housings therefor and to which may be attached one or the other of at least two sets of canopy parts which include canopies, exterior dial panels or housing members and housing parts to manufacture one or the other of at least two types of dispensers each of which has an appearance distinctly different from that of the other.

Since the basic chassis sub-assembly includes all of the common parts of both dispensers, the number of different parts for the two types of dispensers have been minimized and since the number of parts comprising the canopy sets have been minimized, it has been possible to reduce the inventories of chassis sub-assemblies which would otherwise be required if two entirely different dispensers were to be made. Further, long production runs can be made in manufacturing the common parts of the two dispensers with corresponding reductions of cost.

In addition it is possible to carry in stock finished basic chassis sub-assemblies which can be quickly finished out, by the addition of one or the other sets of the canopy parts, to produce finished unit dispensers of the type and kind required by customers. Thus service to the customer is expedited.

These and other objects will become apparent from a study of this specification and the drawings which form a part hereof and in which FIGURE 1 is a perspective view of one type of dispenser.

*Basic Chassis Sub-Assembly*

Figure 3:
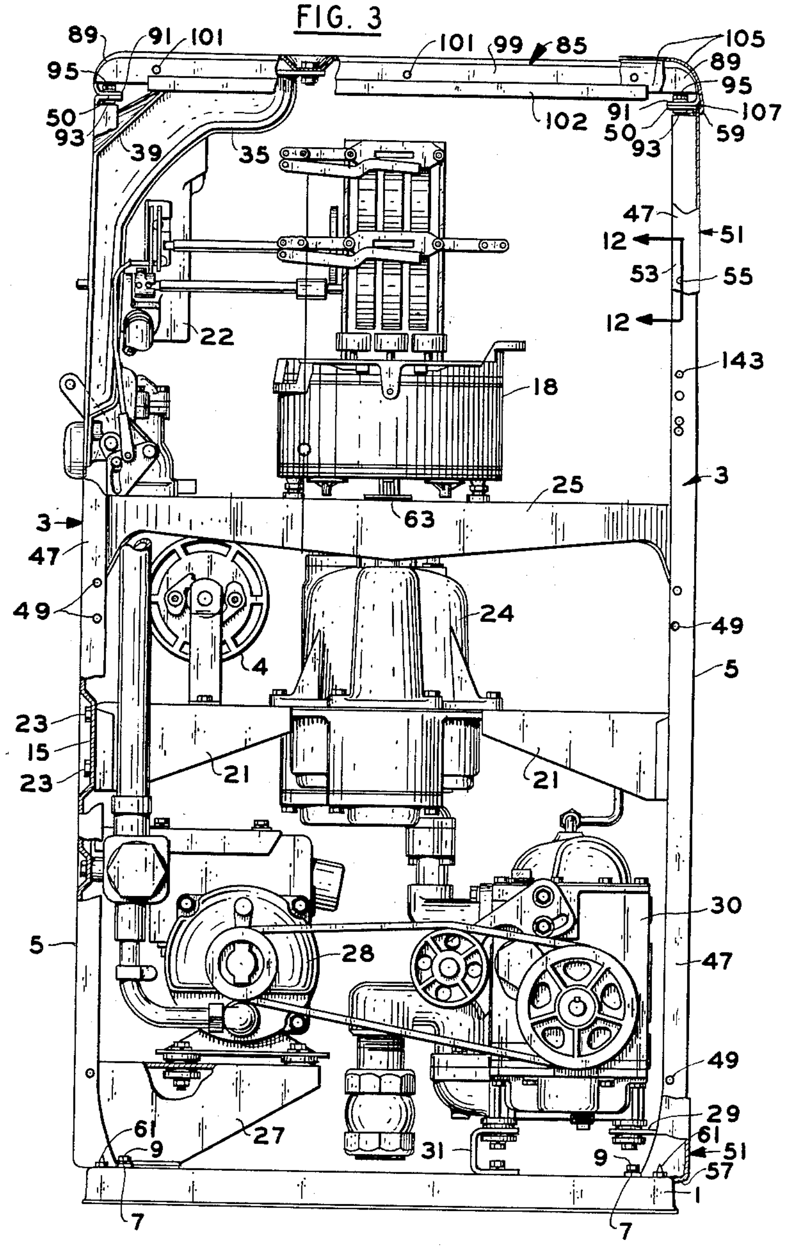
FIGURE 3 is a front elevation of a complete frame for a dispenser of the type shown in FIGURE 1 with the various parts of the dispensing mechanism added to form a dispenser required for the motor pump kind of single units.
Figures 4, 9, 10, 17:
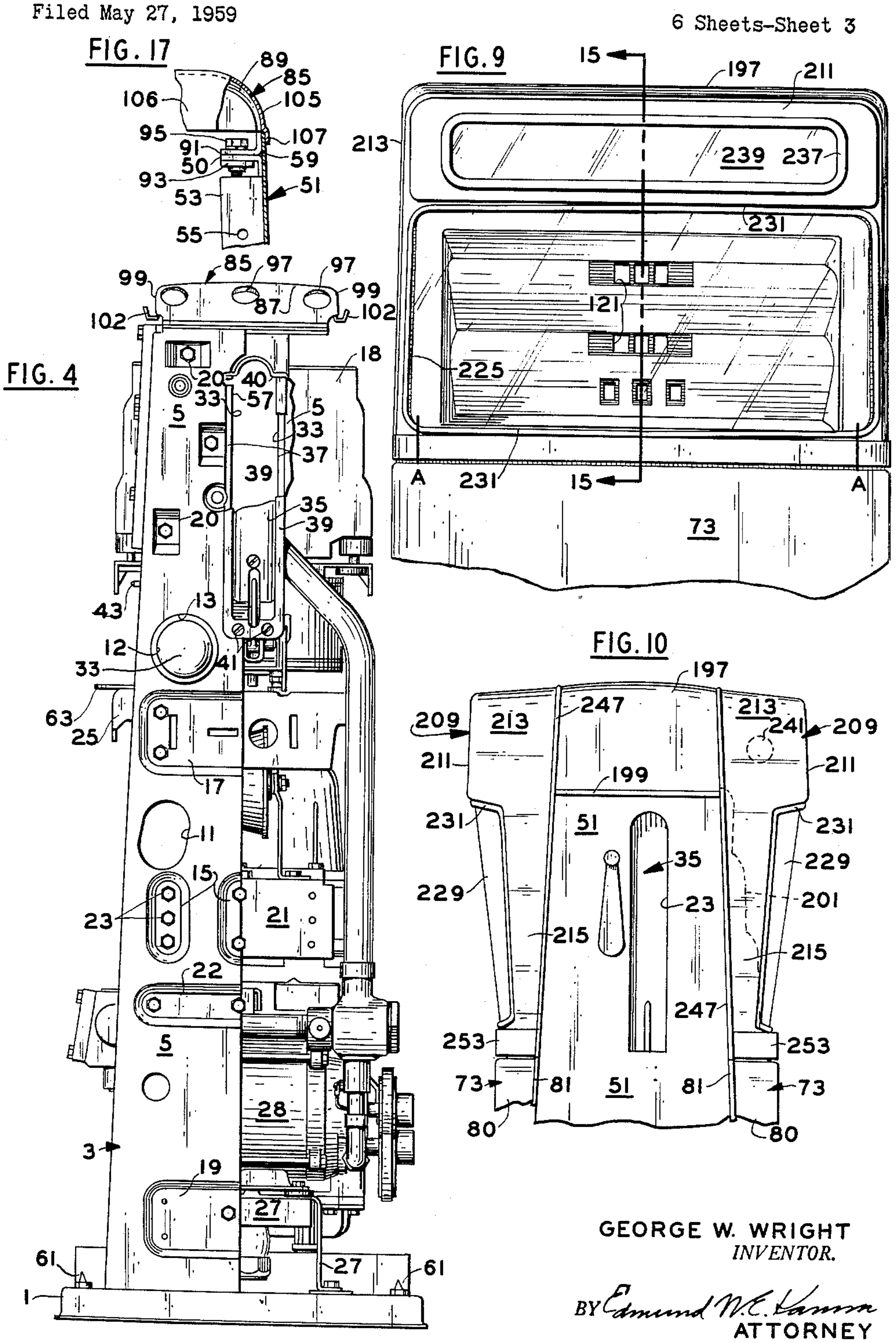
FIGURE 4 is an end elevation of the structure of FIGURE 3.
FIGURE 9 is a front elevation of the upper part of the dispenser of FIGURE 2.
FIGURE 10 is an end elevation of the structure of FIGURE 9.
FIGURE 17 is a partial cross-section taken substantially at 17—17 of FIGURE 6 showing the joint between the side and canopy skins.

Referring first to FIGURES 3 and 4, numeral 1 indicates a generally rectangular base or support which is preferably stamped from heavy gauge sheet metal. Two generally upright side frame members 3 comprise web portions 5 provided with inturned flanges 7 at their bottom ends which are secured to the top of the base by bolts 9. These members are also preferably stamped from heavy gauge metal and incline so as to converge mutually, upwardly to a slight degree. The members are duplicates and are provided with suitable openings (FIG. 4) such as 11, 13, 33, etc. where required, to permit the passage of parts of the dispensing apparatus proper or to permit access at certain locations. The opening 11, for example, permits a hose cable to pass to the cable reel 4, while opening 13 permits the flow indicator glass 33 to extend to the exterior of the dispenser.

The web portions 5 of the side members 3 are also provided with mounting pads 15, 17, 19, 20, 22 (FIG. 4), which are formed by drawing the metal of the member inwardly. Brackets and other frame members may be attached to the pads by bolts which have their heads disposed in the depressions thus formed. The depressions are deep enough to receive the bolt heads so that they will not extend beyond the outer web surface of the member. This enables outer housing elements to rest directly upon this surface as will be described below.

For example, the meter brackets 21 are mounted on the three pads 15 and the heads of bolts 23 are entirely received in the recess formed by the displacement of the material forming the pad. The meter 24 is supported on these brackets.

A combination cross-brace and register support 25 is similarly mounted on pads 17 for supporting the register 18.

Figures 7, 8:
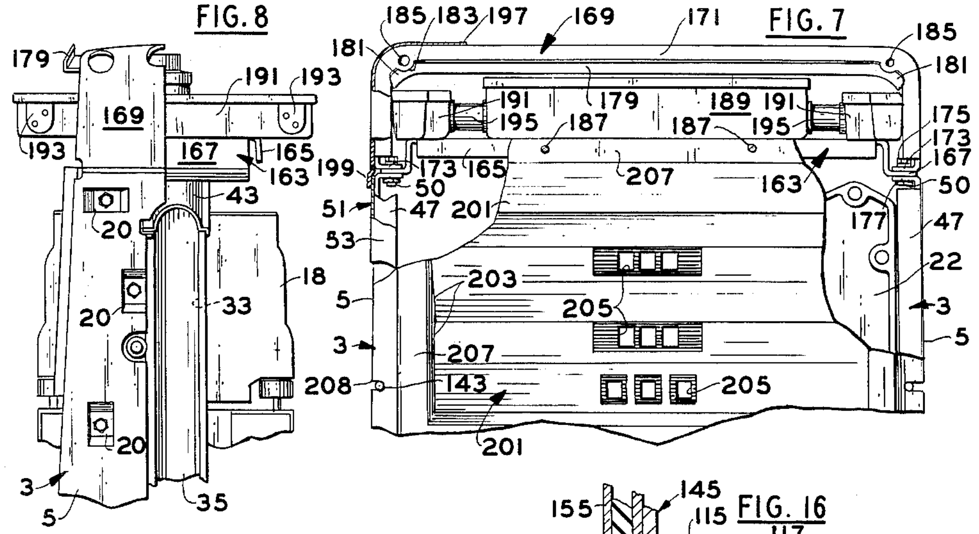
FIGURE 7 is a front elevation of the upper part of a chassis sub-assembly for the dispenser of FIGURE 2.
FIGURE 8 is an end elevation of the structure of FIGURE 7, with parts broken away.

A bracket 27 for the motor 28 is mounted on the pad 19 of one side member and a pump bracket 29 is mounted on the corresponding pad of the other member 3. Suitable pads such as 20, which are similarly formed, except that the metal of the member 3 is slit on the two long sides, are provided to support the switch and junction box 22 (FIGS. 3 and 7). The bracket 29 and a bolster 31, which is attached to the base, support a combined pump and air separator unit 30.

Figure 2:
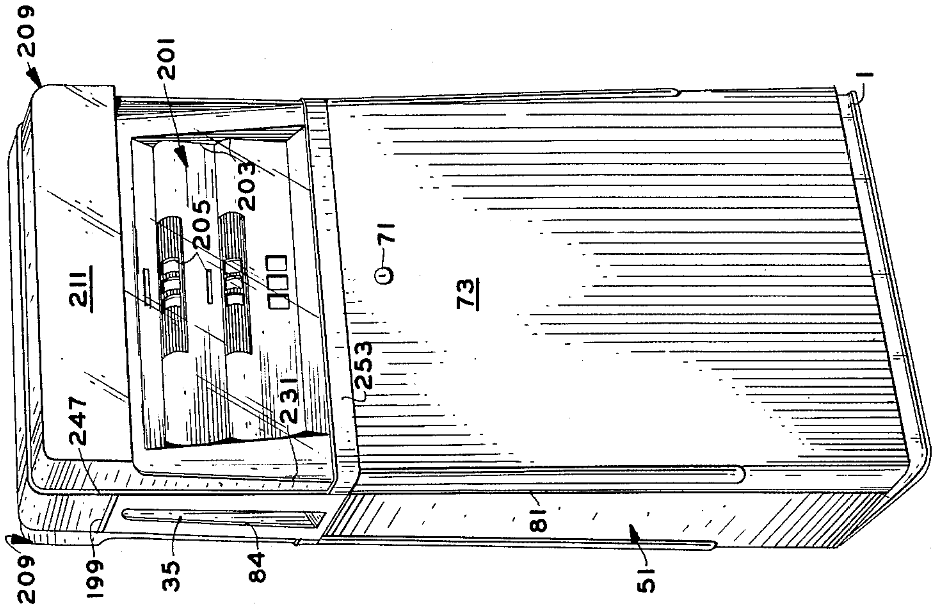
FIGURE 2 is a perspective view of a second type of dispenser.
Figure 1:
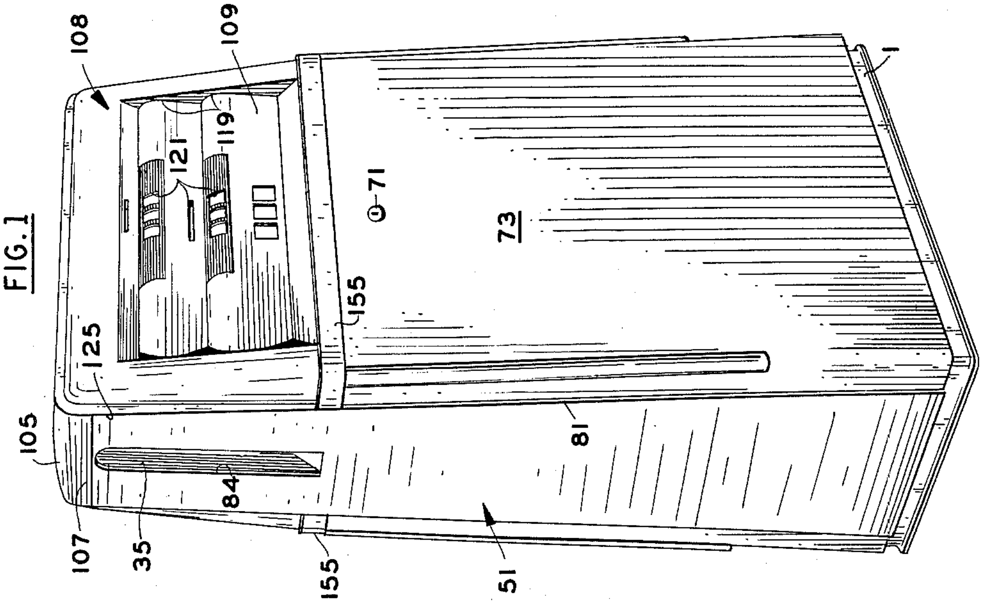

It should be understood that the two types of dispensers shown in FIGURES 1 and 2 may be of two general kinds, that is a "motor-pump dispenser" which includes a motor and a combined air separator as shown in FIGURES 3 and 4 or a "remote control" dispenser in which the motor and pump-separator units are omitted and a control valve (not shown) is added.

In turn these two general kinds may be subdivided into various units, such as "singles" which comprise a single dispensing system including an inlet, a meter, a hose, a register and controls; "full twins" which have two complete dispensing systems each having its own inlet, meter, hose, register and controls or an intermediate unit which has a single inlet but which branches to supply two meters, registers etc.

In this disclosure the term basic chassis sub-assembly is intended to refer to the common structure of any of the units of either of the types and kinds.

It should be further understood that the various parts of the dispensing apparatus needed to produce any unit of either type and kind will be assembled within a frame sub-assembly, comprising the base and end members described which is common to all of the dispensers.

The web portion 5 of each member 3 is provided with an elongated opening 33 (FIGS. 4, 8 and 11) for reception of a nozzle boot 35.

Figures 11, 12, 13, 14:
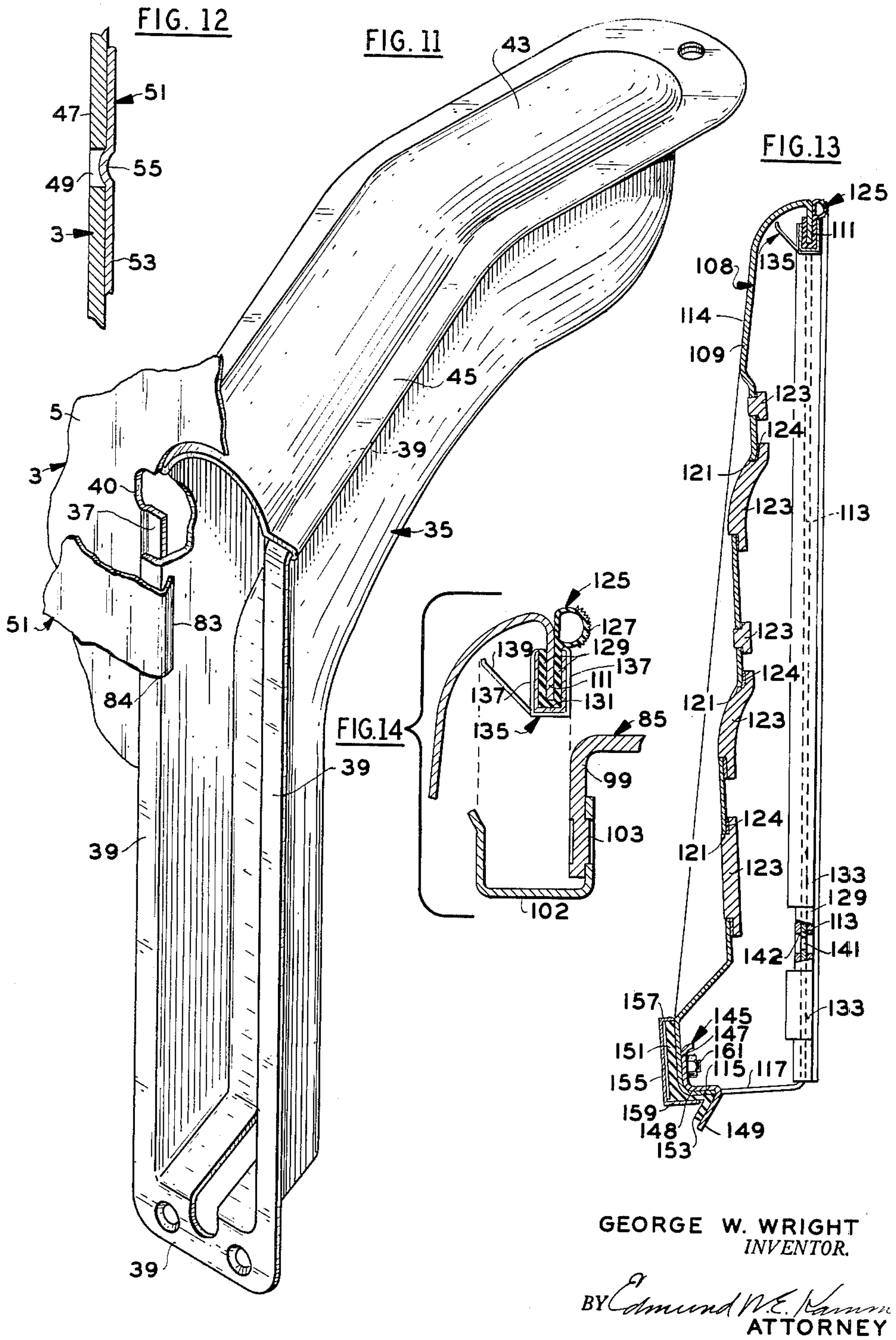
FIGURE 11 is a view of the nozzle boot assembly, showing the manner in which it is mounted in a side member.
FIGURE 12 is a detailed cross-section of the skin holding means, taken substantially at 12—12 of FIGURE 3.
FIGURE 13 is a sectional view of the dial panel of the structure of FIGURES 1 and 5 taken substantially on the line 13—13 of FIGURE 5.
FIGURE 14 is an enlarged cross-sectional view of the dial hanger, seal and clamp showing their relation to each other and to the gutter, taken substantially at 14—14 of FIGURE 5.

The opening 33 is defined on the sides and bottom by a flange 37 (FIGS. 4 and 11) which is offset inwardly, from the outer surface of web 5 (FIGURE 4), to receive the flange 39 of the nozzle boot so that the outer surface of the flange 39 will be flush with the outer surface of the web 5. The flange 37 is notched at 40 on each side of the upper end of opening 33 as shown in FIGURES 4 and 11, to permit the insertion of the boot flanges 39 through the web 65 from the rear thereof. The boot is held in place by countersunk screws 41 (FIG. 4). The lower portion of the boot extends vertically and the upper portion of the boot extends inwardly of the web 5 at an angle to the lower portion as shown in FIGURES 3 and 11, as do the side flanges 39. A cover member 43 (FIG. 11) may be fastened to the upper portion of the boot by means of laterally extending flanges 45 which are crimped over the edges of the flanges 39. Both portions of the boot have a substantially U-shaped cross-section.

The web portion 55 of members 3 (FIGS. 3, 7 and 12) are also provided with inturned side flanges 47, on each side, which are provided with a number of spaced perforations 49. The upper ends of the members are provided with inturned flanges 50 (FIGS. 3, 7 and 17).

The side housing members or skins 51 (FIGS. 1, 2, 3, 7 and 12) lie on and are closely supported by the exterior surface of the associated web 5 and they extend for the full length of such members. The skins are provided with side flanges 53 (FIGS. 3 and 7) which fit closely over the flanges 47 and are held in place on the members by deforming the material of flanges 53 into the holes 49 as shown at 55 in FIGURE 12.

The skins may be of ordinary sheet steel if they are to be painted or they may be of stainless steel, aluminum or other ductile materials and, since they are supported in contact with large areas of the outer surfaces of the members 3 and are fitted closely thereon, they do not need to have the structural strength and rigidity of a panel which spans a large gap, as in the usual dispenser construction. The panels can therefore be made of much thinner stock which is less costly and more easily formed than the usual heavier gauge material. This is particularly important in the case of stainless steel which is both expensive and is difficult to form, even of thin stock. The skins of steel or of stainless steel shown have a thickness about .018 inch whereas the comparable panels used in prior constructions usually had a thickness of about .050 inch.

Furthermore, the large area of support afforded by the member 3 and the close fit of the skins on said members, eliminate vibration and consequent rattles which are experienced with the housing panels of prior constructions.

Each skin is provided with an inturned lower end 57 (FIG. 3) which fits the curvature of the member 3, and is bent slightly inwardly at its upper end 59 so as to enter beneath the corresponding skin of the canopy as shown in FIGURE 17 and as described below.

Each skin is provided with such of the openings corresponding to the openings 11, 13 and 33 in the web 5 of the associated member 3, as are needed for the particular unit and kind of dispenser which is being built. Any unused openings of the members 3 are covered by the skin.

Figures 16, 18:
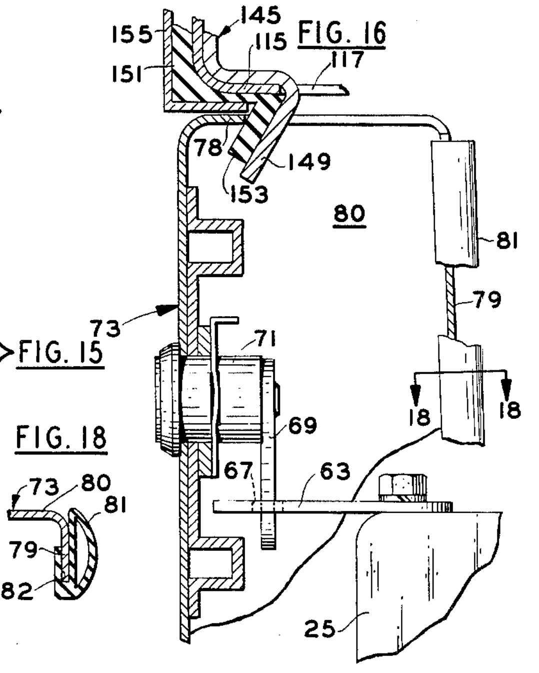
FIGURE 16 is a cross-section of the door and canopy locking mechanism taken on the line 16—16 of FIGURE 5.
FIGURE 18 is a partial cross-section taken substantially at 18—18 of FIGURE 6 showing the door gasket.

The base 1 is provided with a pair of spaced conical pins 61 (FIGS. 3, 4 and 6) on both the front and back sides which are disposed adjacent the respective edges of the base. A latch plate 63 (FIGS. 3, 4, 5 and 16) in the form of a horizontal plate has one side fastened centrally to the top of the brace 25 and projects outwardly, substantially parallel to the base. The projecting portion is provided with a cam slot 67 (FIG. 16) which receives the bolt 69 of a key operated lock 71 which is fixed to the door panel 73 (FIGS. 5 and 16).

Figures 5, 6:
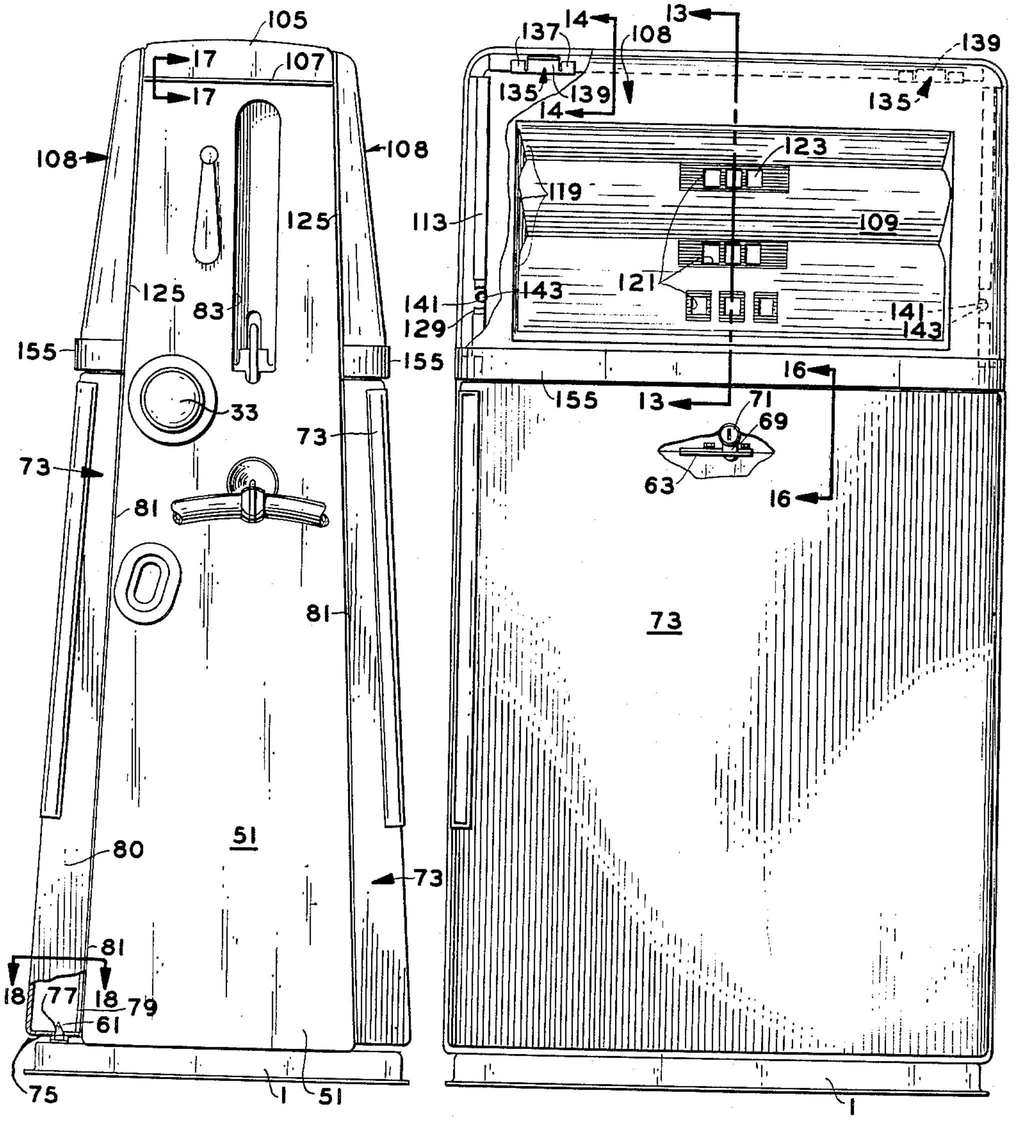
FIGURE 5 is a front elevation of the dispenser of FIGURE 1, with parts broken away to show interior structure.
FIGURE 6 is an end elevation of the dispenser of FIGURE 5, with parts broken away to show interior structure.

As shown in FIGURE 6, the door 73 has an inturned bottom flange 75 on which the door may pivot toward and from the members 3 and which is perforated at 77 to receive the pins 61. The door also has an inturned top flange 78 (FIG. 16). The door is removably attached to the chassis merely by dropping the holes 77 over the pins 61, pivoting the door toward the members 3 and latch plate 63 and rotating the latch bolt into the cam slot 67 to draw the door tightly against the frame and lock it in place.

Each side wall 80 of the door is provided with an inturned flange 79 (FIGS. 6, 16 and 18) which is adapted to overlie the corresponding flanges 53 of the skin 51 and a substantially tubular, gasket 81 which has a slot 82 (FIG. 18) fixed to the flange 79 by slipping the flange into the slot, thereby positioning the tubular part of the gasket so as to be compressed between the flanges 53 and 79 (FIG. 6) to seal the joint as the door is closed and locked.

The edge of the opening 83 in the skin, which matches the opening in the nozzle boot is curved inwardly at 84 (FIGS. 1 and 11) so as to enter the boot a short distance to provide a smooth joint therewith.

The structure thus far described constitutes the basic chassis sub-assembly which may be finished out to produce either one of the dispenser types shown in FIGURES 1 and 2, by adding one or the other of two sets of additional parts. As explained above, the basic chassis sub-assembly may be of the motor pump or remote control kind and may be the single, twin or intermediate unit.

*Parts Added to Form FIG. 1 Dispenser*

The first set of parts, which is used in the assembly of the type of dispenser shown in FIGURE 1, includes a canopy 85 (FIGS. 3 and 4) of heavy stamped metal having a top or web portion which has a slight curvature along the narrow dimension (FIG. 4) and is substantially straight in the longitudinal direction (FIG. 3). The ends of the canopy are curved downwardly at 89 (FIGS. 3 and 17) and terminate in an inturned flange 91, which is disposed in parallel contact with the flange 50 of the corresponding side member 3. A flat bar 93, having tapped holes therein, is disposed underneath flange 50 and receives screws 95 which are passed through aligned holes in the flanges 89 and 50.

Three access openings 97 (FIG. 4) are provided adjacent each end of the canopy to permit the placing and tightening of screws 95.

The depending marginal or side flanges 99 of the canopy extend downwardly and slightly outwardly so that they lie substantially in the same plane as the corresponding flanges 47 of the side members 3 and have a number of spaced perforations 101.

An upwardly open, U-shaped trough 102 (FIGS. 3, 4 and 14) is fixed to each flange by spot welding, one leg to the interior surface of such flange at 103. The web of the trough extends under the edge of the flange 99 and the other leg projects upwardly and outwardly from the web. The ends of the trough terminate a short distance from the frame members 3 (FIG. 3).

A skin 105, of relatively thin sheet metal, which may be stainless steel or any other suitable material, is pressed to a shape comprising a web portion and marginal flanges and to dimensions which enables it to fit snugly the top and end contours and the marginal or side flanges of the canopy. This skin is held tightly in place thereon by deforming the metal of the skin flanges into the holes 101 in the same manner as used to hold skins 51 (FIG. 12).

The lower edge of each end of the canopy skin 105 is slightly offset outwardly at 107 (FIG. 17) so as to receive the upper end 59 of the adjacent skin 51 and to have surface to surface contact therewith to seal the joint therebetween.

Since the skin 105 is afforded extensive support by close contact with a large portion of the outer surface area of the canopy 85, it can be much thinner than would be required for a panel member such as is commonly used and this, as well as the close fit between the canopy and skin, prevents vibration and rattling of the skin. The canopy skin is preferably the same thickness as skin 51.

An upper housing unit, which in the case of a dispenser of the type shown in FIGURE 1, is a dial panel 108 (FIGS. 1, 5, 6 and 13) is attached as a separate and removable unit to each side of the chassis to complete the dispenser.

This panel comprises a dial 109 which is stamped from relatively heavy sheet steel and has a down turned flange 111 running lengthwise along the top wall thereof, in a substantially vertical plane. It also has an inturned flange 113 running along each end wall 114 which forms a continuation of flange 111 and lies in the same plane. There is also an inwardly extending flange 115 running along the bottom of the front portion of the dial and which continues as a flange 117 at the bottom side portions of each end wall 114, all of which lie substantially in the same horizontal plane (FIG. 13).

The dial is formed with contours 119 (FIG. 1), which follow the contours of the register 18 (FIG. 4) which is adjacent thereto, and the dial is formed with openings 121 (FIGS. 1, 5 and 13) through which portions of the register indicators may be seen. A plurality of glass windows 123, one for each horizontally aligned set of openings 121, are formed so as to project through the openings 121 and corresponding openings in the associated gaskets 124. The glass windows are cemented to the gaskets which are, in turn, cemented to the interior surface of the dial, to cover and seal off the openings 121. The dial is preferably coated with a fired vitreous enamel of any desired color.

A rubber seal strip 125 (FIGS. 13 and 14) having a tubular sealing portion 127 and a grooved or U-shaped attaching portion 129 is installed on flanges 111 and 113 by slipping the flanges into the groove, so that a continuous seal is provided along the top and both sides of the dial. The portion 129 of the seal strip is held in place on flange 111 by a U-shaped clamp 131 which is placed thereover and is crimped thereon. Similar clamps 133 are used to hold the seal on the flanges 113.

At least two hangers 135 (FIGS. 5 and 13) are mounted on the clamp 131 at points spaced from each end thereof. Each hanger has a pair of upwardly open, channel portions 137 disposed one on each longitudinal side (FIG. 5) of an upwardly and outwardly extending spring finger 139. The upper ends of the legs of the portions 137 are crimped over the ends of the clamp 131, as shown in FIGURE 14 to insure that the hangers will stay in place.

As shown in FIGURE 14, to install the dial panel, the flange 111, hangers 135 and the associated elements shown in the upper part of the figure, are lowered and forced downwardly into the trough 102. In this process, the spring fingers 139 are bent upwardly by the outer leg of trough 102 to force the entire panel toward the right, at the top thereof, to compress the tubular portion 127 of the seal strip between the upper part of the dial panel and the flange of the canopy skin 105, to establish a seal therebetween.

The flanges 113 are each provided with a locating notch 141 (FIGS. 3, 5 and 13) which receives a conical locating pin 143 set in the flange 47 of the corresponding end member 3. The portions 129 of the seal are suitably punched out at 142 to permit passage of the pin. The pins and notches serve to properly align the dial panel laterally with respect to the chassis.

The inside of the lower front portion of the dial (FIGS. 13 and 16) is fitted with a transversely extending, door interlocking support 145 which has an upwardly extending leg 147 disposed generally parallel to the dial, a horizontal web 148 which lies on the dial flange 115 and a downwardly and outwardly extending leg 149 which extends below the bottom of the dial.

A seal 151 having a cross-sectional form very similar to that of the support 145 is disposed against the outer front side of the dial, the lower side of dial flange 115 and has a leg 153 lying against the leg 149. A channel shaped trim strip 155 extends along the bottom and around the ends of the dial as shown in FIGURES 1, 5 and 6, parallel to the support. It has a short upper leg 157 overlying the seal 151 and a lower leg 159 underlying the web portion of the seal. The trim strip is provided with a number of threaded studs 161, which pass through openings in the seal, the dial and the support 145 and receive nuts to hold these parts firmly together.

When the dial panel has been mounted on the trough as described above and when it is swung inwardly over the locating pins 143 and when the door panel 73 is swung to the position shown in FIGURES 6 and 16, the dial panels will be forced toward the side members 3 to compress the vertical tubular portions 127 of the seal 125 between the dial flanges 113 and the skin flanges 53 to seal the joint. The dial panel will be held in this position by the door when the latter is latched in the position of FIGURE 16 because the upper flange 78 of the door is forced into and is held in pressure contact with the leg 153 of the seal 151 on the interlocking support 145, by the cam slot and latch bolt to seal this joint.

The dispenser shown in FIGURE 1, comprising the basic chassis sub-assembly and one set of canopy parts, is thus completed.

*Parts Added To Form Dispenser of FIG. 2*

To finish out a basic chassis sub-assembly into a dispenser like that shown in FIGURE 2, a different set of parts is added to such sub-assembly.

In this case a shelf 163 is provided (FIGS. 7 and 8) which has downturned side flanges 165 and end flanges 167 which have an L-shaped cross-section and which rest on the top flanges 50 of members 3. A canopy 169 is also provided with side flanges 171 and inturned end flanges. The latter rest on top of flanges 167 and the shelf and canopy are held on the side members 3 by screws 175 which pass these aligned holes in these parts and are screwed into a tapped bar 177 disposed beneath flange 50.

A trough 179 is spot welded to the upper side flanges 171 of the canopy in a manner similar to that described above. These troughs have downwardly curved ends 181 which terminate closely adjacent the vertical portions of canopy flanges 171. The outer legs of the troughs are notched at 183 at each end, to provide access to the upper holes 185 which are used to anchor the canopy skin on the canopy. Holes are formed in the flanges 165 of the shelf to receive screws 187 for mounting the dials as will be described.

A closed receptacle 189 is mounted on the shelf and contains the starting devices which are necessary for fluorescent lamps. The lamp socket supports 191 and sockets 193 are mounted on the shelf and are joined to the receptacle by means of suitable conduit connections 195. The supports and sockets extend laterally out from under the canopy as shown in FIGURE 8. Suitable conduit means (not shown) are provided for connecting the right hand support 191 (FIG. 7) with the switch and junction box 22 to house the necessary connecting wires.

The canopy is fitted with a skin 197 which has an offset terminal portion 199 to receive the end 59 of the skin 51, in the same manner as disclosed above and as shown in FIGURE 17.

A dial 201, having contours 203 and having indicator display openings 205 similar to those described above, has a peripheral flange 207. The top run of this flange is perforated to receive the screws 187 which hold it in place and the vertical runs of the flange have notches 208 positioned to receive the conical locating pins 143 of the end members 3. One such dial is, of course, mounted on the front and one on the back side of the dispenser. There is no glass attached to the back of the dial, since the entire dial is enclosed by the upper housing unit indicated generally by 209 and which is shown in detail in FIGURES 9, 10 and 15.

The housing 209 may be press formed of relatively heavy steel or may be molded of plastic material. It has an upper, substantially planar front wall 211 which extends laterally, substantially the full width of the pump and which has height substantially equal to that of the canopy 169. This wall merges with the end walls 213 which converge outwardly, slightly (FIG. 9) have downwardly tapering portions 215 (FIG. 10) and which in turn merge with a relatively narrow, transversely extending, lower front wall 217 (FIGS. 10 and 15 esp.)

The two front walls 211 and 217 are formed inwardly as at 219 and 221 (FIG. 15) and then downwardly and upwardly, respectively, to form a continuous flange 223 which frames a window opening 225 (FIG. 9). The upper portion of flange 213 extends in a curve of long horizontal radius (FIG. 9) which is convex inwardly, between the lines A—A FIG. 9. The length of the walls 219 and 221 increase gradually as the lines A—A are approached. Beyond these lines these lengths increase more rapidly, so that the flange 223 curves inwardly as shown at 227, on a relatively short radius, adjacent the sides of the housing.

Figure 15:
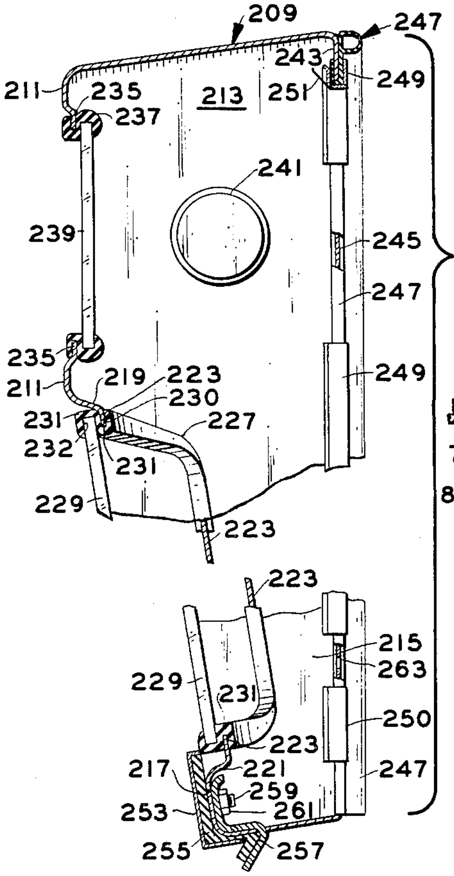
FIGURE 15 is a cross-sectional view of the dial housing of the structure of FIGURES 2 and 9 taken substantially on the line 15—15 of FIGURE 9.

As is shown in FIGURE 15, the bottom run of flange 223 at the bottom of the window is set inwardly from the top run thereof. However, the opening defined by the flange, when viewed from the front, is generally rectangular with rounded corners as shown in FIGURE 9.

A window pane 229 is formed so that its peripheral edge will lie closely parallel to the entire flange 223. A rubber grommet 231 is provided which has parallel slots 230, 232 formed therein from opposite sides, so that it will be generally S-shaped in cross-section as shown in FIG. 15. The inner slot 230 of the grommets is forced over the flange 223 and the outer slot 232, which lies outside of the flange 223, is worked over the peripheral edge of the pane, so as to hold it in place on the housing. The grommet extends entirely around the pane so as to seal the window in the housing.

If desired, instead of a continuous front wall 211 as shown in FIG. 2, this wall may be provided with a window (FIG. 15) formed therein which is defined by a continuous flange 235. The flange is preferably offset slightly inwardly from the wall 211, as shown in FIGURE 15. This flange is disposed in a single plane and is fitted with a grommet 237, like 231, and a glass panel 239 is fitted in the grommet, preferably on the inside of the wall. This glass may be suitably decorated and usually displays the brand of fuel which is being sold from the dispenser.

A fluorescent lamp tube 241 is supported by the sockets 193 behind the glass 239 in approximately the position shown in FIGURES 10 and 15 so that the glass will be backlighted by the lamp. Since the dial 201 projects into the housing as shown in dashed lines in FIGURE 10, it will also be lighted by the lamp from above. The illumination of the dial is enhanced by reason of its inclination from the vertical and the contours 203 as shown in FIG. 10.

The top and side walls of the housing are provided with inwardly directed flanges 243, 245 respectively which are continuous at the top and both ends and are similar to flanges 211 and 213 of the dial panel 108. These flanges are provided with a seal strip 247, channel clamps 249, 250 and hangers 251 similar to 125, 131, 133 and 137 described and shown in FIGS. 13 and 14 for the dial panel. These elements are mounted on the housing 209 in the same manner as described above.

The lower front wall is also fitted with a trim strip 253, a Z-shaped seal 255 and a Z-shaped support 257 like those of the dial panel 109. These elements are attached to the housing in the same manner, by studs 259 and nuts 261.

As before, the entire housing assembly is mounted on the dispenser chassis by inserting the hangers 251 in the trough 179, aligning the notches 263 in flanges 245 with the pins 143 in the members 3, forcing the housing downwardly, swinging the bottom part thereof toward the members 3 to engage pins 143 and thereafter moving the door panel 73 to locking position and locking it.

It will thus be seen that the primary objectives recited at the outset having been attained.

It is obvious that various changes may be made in the form, structure and arrangement of parts of the specific embodiments of the invention disclosed herein for purposes of illustration, without departing from the spirit of the invention. Accordingly, applicant does not desire to be limited to such specific embodiments but desires protection falling fairly within the scope of the appended claims.

I claim:

1. A frame and housing structure comprising a support, a frame member on said support and extending therefrom, said member comprising a web portion having flanges extending from opposite sides thereof and in the same general direction, a skin of thin ductile sheet material, said skin having little resistance to deformation and comprising a web portion and flanges which are substantially coextensive with and are formed to fit over and in close contact with the web and flanges of said member for substantially continuous support thereby, the flanges of said member defining spaced perforations and portions of said skin flanges being deformed into said perforations so as to hold the skin on said member.

2. A frame structure comprising a support, a frame member on said support and extending therefrom, said member comprising a web portion having flanges extending from opposite sides thereof and in the same general direction, mounting pads formed on said member by displacing the portions of said web in the same general direction as said flanges, said pads defining openings to receive headed fasteners, said displacement of the web portions to form the pads being greater than the thickness of the heads of said fasteners, a skin of thin ductile sheet material, said skin having little resistance to deformation and comprising a web portion and flanges which are substantially coextensive with and are formed to fit over and in close contact with the web and flanges of said member for substantially continuous support thereby except in the region of said displaced portions, the flanges of said member defining spaced perforations and portions of said skin flanges being deformed into said perforations so as to hold the skin on said member.

3. A frame and housing structure comprising a support having multiple sides, at least two frame members extending in the same general direction from different sides of said support, a canopy disposed in spaced relation with respect to said support, extending between said members and connected thereto, said members and canopy each comprising a web portion having flanges extending from opposite edges thereof, the corresponding flanges of said members and canopy extending toward each other and being disposed substantially in a common plane, said flanges defining spaced perforations disposed along the respective webs, a skin of thin ductile material for each member and the canopy, said skins having little resistance to deformation and each comprising a web portion and marginal flanges which are substantially coextensive with and formed to fit over and in close contact with the corresponding member and canopy webs and flanges for substantially continuous support thereby, the portions of said skin flanges overlying said perforations being deformed into said perforations so as to hold the skins in place.

4. The structure defined by claim 3 wherein the skins of said members each terminate in a free projecting end, adjacent the canopy and said canopy skin terminates in a free projecting end adjacent each member, said adjacent canopy and member skin ends extending into overlapping relationship to establish a seal.

5. A frame and housing structure comprising a support having multiple sides, at least two frame members extending in the same general direction from different sides of said support, a canopy disposed in spaced relation with respect to said support, extending between said members and connected thereto, said members and canopy each comprising a web portion having flanges extending from opposite edges thereof, the corresponding flanges of said members and canopy extending toward each other and being disposed substantially in a common plane, said flanges defining spaced perforations disposed along the respective webs, a skin of thin ductile material for each member and the canopy, said skins having little resistance to deformation and each comprising a web portion and marginal flanges which are substantially coextensive with and formed to fit over and in close contact with the corresponding member and canopy webs and flanges for substantially continuous support thereby, the portions of said skin flanges overlying said perforations being deformed into said perforations so as to hold the skins in place, a door having a width sufficient to span said side members, means for mounting said door for pivotal movement to and from a closed position relative to said side members, said door having inturned flanges, along its sides, disposed to overlap and lie substantially parallel to the corresponding flanges of the adjacent side members when the door is closed and yieldable seal means on said door and extending over said inturned flanges so as to be compressed between said door flanges and side member flanges when said door is closed.

6. The structure defined by claim 5 which includes latching means supported by said door and said side members for holding said door closed.

7. A frame and housing structure comprising a support having multiple sides, at least two frame members extending in the same general direction from different sides of said support, a canopy disposed in spaced relation with respect to said support, extending between said members and connected thereto, said members and canopy each comprising a web portion having flanges extending from opposite edges thereof, the corresponding flanges of said members and canopy extending toward each other and being disposed substantially in a common plane, said flanges defining spaced perforations disposed along the respective webs, a skin of ductile material for each member and the canopy, said skins each comprising a web portion and marginal flanges adapted to fit closely over the corresponding member and canopy web and flanges, the portions of said skin flanges overlying said perforations being deformed into said perforations so as to hold the skins in place, an upper housing unit having a width sufficient to span the side members, means for mounting said housing unit for pivotal movement to and from a closed position relative to said side members, said housing unit including inwardly directed flanges along its side and top, disposed to overlap and lie substantially parallel to the corresponding flanges of the adjacent canopy and side members when the unit is closed, and seal means mounted on said unit and extending over the flanges of said unit so as to be compressed between them and the flanges of the end members and canopy when the unit is in its closed position.

8. The structure defined by claim 7 wherein said upper housing unit comprises a dial, window openings defined by said dial and transparent means fixed to said dial for closing said openings.

9. The structure defined by claim 7 wherein said means for closing said openings include projections extending into and substantially filling said openings and means for sealingly securing said closing means to the interior of said dial.

10. The structure defined by claim 7 which includes a dial mounted on said canopy and side member flanges and wherein said upper housing unit defines a window opening disposed adjacent said dial for displaying same, a transparent closure for said window opening and means for sealingly mounting said window on said unit to close said opening.

11. The structure defined by claim 10 wherein said upper housing unit includes an upper front wall which defines an opening, a translucent closure for said opening, means for sealingly mounting said closure on said upper front wall to close said opening, a cylindrical fluorescent lamp and means for mounting said lamp behind said closure.

12. A frame and housing structure comprising a support having multiple sides, at least two frame members extending in the same general direction from different sides of said support, a canopy disposed in spaced relation with respect to said support, extending between said members and connected thereto, said members and canopy each comprising a web portion having flanges extending from opposite edges thereof, the corresponding flanges of said members and canopy extending toward each other and being disposed substantially in a common plane, said flanges defining spaced perforations disposed along the respective webs, a skin of ductile material for each member and the canopy, said skins each comprising a web portion and marginal flanges adapted to fit closely over the corresponding member and canopy webs and flanges, the portions of said skin flanges overlying said perforations being deformed into said perforations so as to hold the skins in place, a door having a width sufficient to span said side members, means for mounting said door for pivotal movement to and from a closed position relative to said side members, said door having inturned flanges, along its sides, disposed to overlap and lie substantially parallel to the corresponding flanges of the adjacent side members when the door is closed and yieldable seal means on said door and extending over said inturned flanges so as to be compressed between said door flanges and side member flanges when said door is closed, an upper housing unit having a width sufficient to span the side members, means for mounting said housing unit on said canopy for pivotal movement to and from a closed position relative to said canopy and side members, said housing unit including inwardly directed flanges along its sides and top, disposed to overlap and lie substantially parallel to the corresponding flanges of the adjacent canopy and side members when the unit is closed, and seal means mounted on said unit and extending over the flanges of said unit so as to be compressed between them and the flanges of the end members and canopy when the unit is in its closed position.

13. The structure defined by claim 5 wherein said means for pivotally mounting said door comprises a bottom flange on said door extending along the bottom edge thereof and in a direction substantially normal to said inturned side flanges, said flange defining at least two spaced holes, and a pair of spaced tapered pins mounted on and projecting upwardly from said support so as to enter said holes.

14. The structure defined by claim 7 wherein said means for pivotally mounting said housing unit comprises an upwardly open trough mounted on said canopy, a downturned flange extending along the top of the housing unit, a seal strip mounted on and overlying said flange, and means for clamping said seal strip on said flange, said flange and clamping means being disposed so as to enter said trough for pivotal support thereby.

15. The structure defined by claim 14 wherein said seal strip extends around the upper corners of the housing unit and downwardly along the sides thereof and is mounted on the inwardly directed top and side flanges of said unit, clamps for holding said seal strip on said flanges and spring means mounted on the top flange for engagement with the outer wall of said trough for urging the downturned flanges of the housing unit toward said canopy to compress said seal strip between the downturned flange and the corresponding flange of said canopy skin.

16. A frame and housing structure comprising a base, a pair of side members mounted on opposite sides of the base and extending upwardly therefrom, a canopy mounted on the upper ends of said side members, said canopy and side members having contiguous edges and inturned flanges along corresponding ones of such edges disposed substantially in a common plane, an upwardly open trough fixed to each canopy flange and extending between said side members, a housing unit having a width sufficient to span said side members and having substantially coplanar inturned flanges along its top and side walls adapted to overlie the canopy and side member flanges, a seal strip mounted on said unit top and side flanges and having a seal portion overlying said flanges, an interlocking support mounted on the unit along the lower side thereof and extending downwardly therefrom, said upper flange of a unit being entered in the corresponding trough so as to mount said unit for pivotal movement to and from a closed position with said side members and to compress said gasket strip between said unit flanges and those of said side members and canopy, a door having a width sufficient to span said side members and a height to substantially span the space between the unit housing and said base, said door including end walls and inturned flanges disposed along the top and bottom of the door and along the side and bottom of said end walls, said end wall side flanges being substantially coplanar and disposed to overlie the side member flanges, a seal strip mounted on said end wall flanges and having a sealing portion disposed between said end wall finages and said end member flanges, said bottom flange defining spaced holes, pins mounted on said base, extending upwardly therefrom and spaced so as to enter said holes, said base, bottom flange and pins serving to mount said door for pivotal movement to and from a closed position relative to said side members, said unit interlocking support projecting into the path of the upper door flange, whereby closing of said door causes closing of said housing unit, and means for holding said door closed.

17. The structure defined by claim 16 which includes skins mounted on said canopy and end walls so as to cover the exterior surfaces thereof, the adjacent ends of the side member skins and the canopy skin extending in overlapping relation.

18. A frame and housing structure for a fuel dispenser comprising a base, a side frame member mounted on said base to extend upwardly therefrom, said member defining a vertical elongated opening and being offset adjacent the bottom and side edges of said opening to define a recess, terminating at its upper ends in transverse notches, a nozzle boot comprising side and end walls defining a lower portion and an upper portion, both of generally U-shaped cross-section, said upper portion extending at an angle away from the open side of said lower portion, a substantially continuous, out-turned flange encompassing the open side of said boot, a cover attached to the upper portion of said boot to close the opening thereof, the side and bottom portions of the flange adjacent the lower portion of said boot being mounted in said recess, with the portions of said flanges intermediate said portions of said boot extending through said notches, and means for securing said boot to said member.

19. The structure defined by claim 18 including a skin mounted on said member and defining an opening having a shape and size corresponding to the opening defined by the walls of the lower portion of said boot and cover, the portion of said skin adjacent said opening extending over said boot flange and into said boot and cover, to form a lap joint therewith.

20. A frame and housing structure comprising a base having multiple sides, at least two side frame members mounted on and extending in the same general direction from different sides of the base, a canopy disposed in spaced relation with respect to said base and extending between said side members, the top ends of said members and the bottom ends of said canopy having mating flanges, means for fastening said mating flanges together, an upwardly open, substantially rectilinear trough mounted on and along a longitudinal side of the canopy between said frame members, said trough extending outwardly from the side of the canopy, a housing unit adapted to span said members and including substantially rectilinear means to enter said trough for pivotally mounting the unit thereon.

21. The structure defined by claim 20 which includes a shelf disposed below and substantially parallel to and coextensive with said canopy, said shelf including a flange at each end adapted to be fastened to said mating flanges.

22. In a frame and housing structure for an apparatus, comprising a base having multiple sides, at least two side frame members mounted on different sides of said base and extending generally in the same direction therefrom, said members defining a plurality of openings, a thin, metal skin having little resistance to deformation, formed to fit on and in close contact with the exterior of each member for support by substantially the entire external surface thereof, each skin defining openings corresponding to some of the frame member openings and means for fastening said skins on the exterior of said respective members so as to blank any remaining openings.

23. The structure defined by claim 22 in which said members are identical.

24. The structure defined by claim 22 wherein said members define a plurality of outwardly open depressions defining all of the interior mounting pads required for a said number of different models of said apparatus, headed fasteners extending through said members and having their heads disposed in certain of said depressions, said depressions having a depth which is greater than the thickness of the heads so that said skins serve to conceal the depressions and fastener heads.

References Cited in the file of this patent

UNITED STATES PATENTS

| | | |
|---|---|---|
| 1,257,495 | Krueger | Feb. 26, 1918 |
| 1,698,252 | Ashe | Jan. 8, 1929 |
| 1,990,629 | Bales | Feb. 12, 1935 |
| 2,141,124 | Bradley | Dec. 20, 1938 |
| 2,146,939 | Coordes | Feb. 14, 1939 |
| 2,167,995 | Preston | Aug. 1, 1939 |
| 2,527,226 | Levine | Oct. 24, 1950 |
| 2,598,957 | Wolfe | June 3, 1952 |
| 2,680,667 | Wile | June 8, 1954 |
| 2,738,049 | Shepherd | Mar. 13, 1956 |